No. 780,370. PATENTED JAN. 17, 1905.
G. D. MUNSING.
VEHICLE WHEEL.
APPLICATION FILED JULY 21, 1904.
2 SHEETS—SHEET 1.
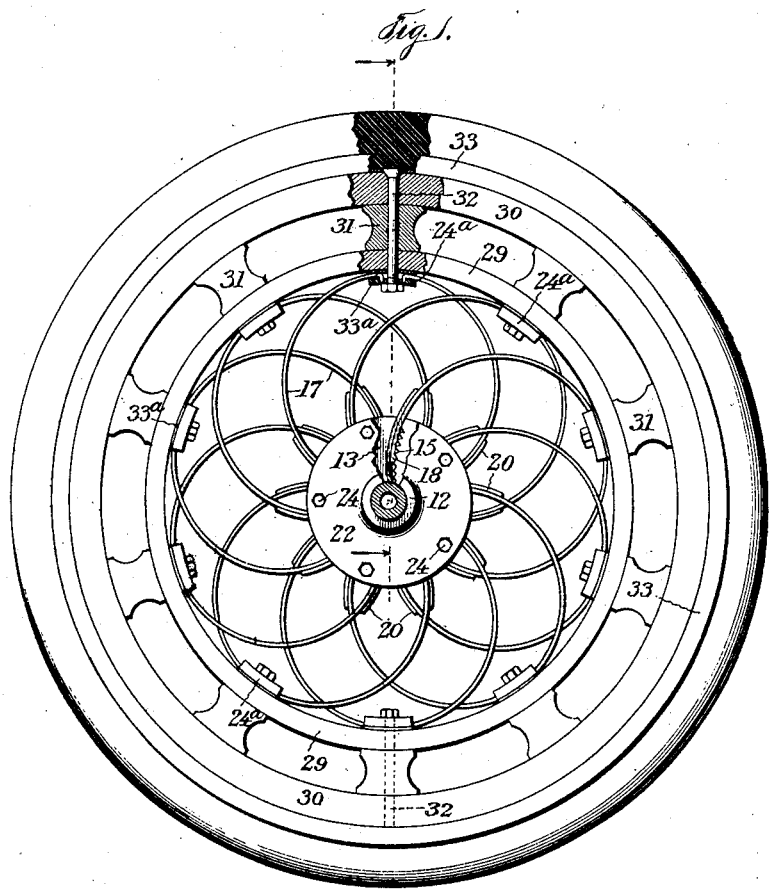
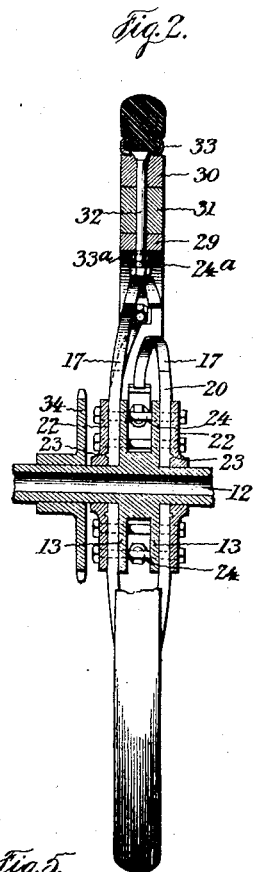
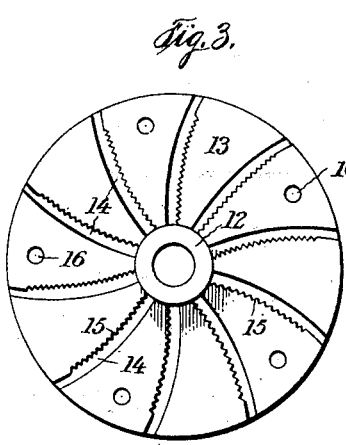
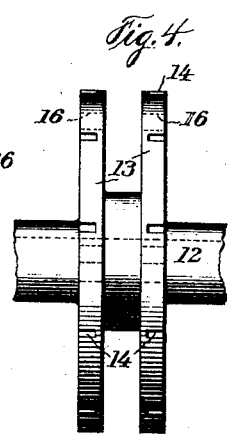
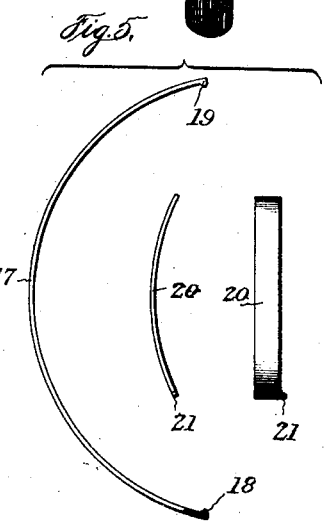
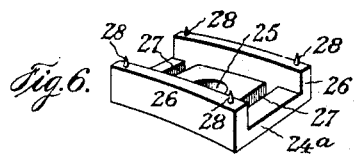
Inventor
George D. Munsing
by Henry Orth
Atty.
Witnesses:

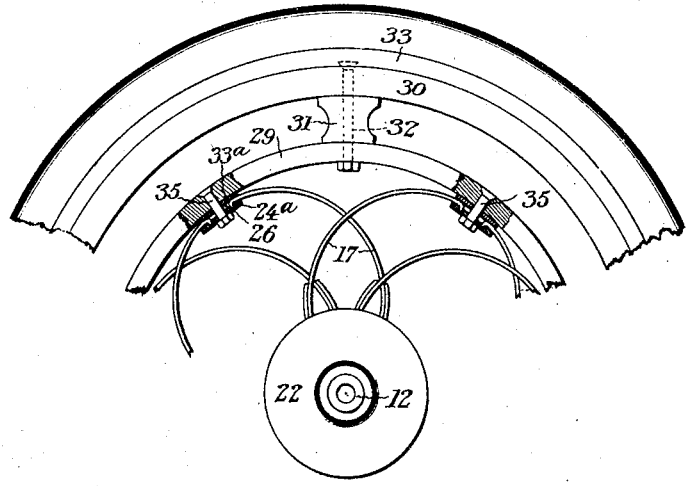

No. 780,370.

Patented January 17, 1905.

UNITED STATES PATENT OFFICE.

GEORGE D. MUNSING, OF ATLANTIC HIGHLANDS, NEW JERSEY.

VEHICLE-WHEEL.

SPECIFICATION forming part of Letters Patent No. 780,370, dated January 17, 1905.

Application filed July 21, 1904. Serial No. 217,515.

*To all whom it may concern:*

Be it known that I, GEORGE D. MUNSING, a citizen of the United States, residing at Atlantic Highlands, in the county of Monmouth and State of New Jersey, have invented certain new and useful Improvements in Vehicle-Wheels; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to vehicle-wheels, and more particularly to wheels for automobiles or touring-cars, to provide an elastic strong wheel easily trued, and a non-skidding tire that will hold well at fast speeds when making turns.

Referring to the drawings, in which like parts are similarly designated, Figure 1 is a side view of one form of wheel, partly in section; Fig. 2, a partial section and elevation. Fig. 3 is a plan view of the hub. Fig. 4 is an edge view thereof. Fig. 5 illustrates the spring and its retaining member. Fig. 6 is a perspective of the inner felly spring-clamp. Fig. 7 is a modification of the wheel structure.

The wheel comprises a hub 12, having two similar flanges 13, each provided with curved grooves 14, one of the lateral walls of each of the grooves being provided with serrations or notches 15 and bolt-holes 16. Into each groove fits one end of a spring-spoke 17, having its extreme ends turned over to form a lug or having a lug 18 formed on it, and the other end of the spring has a similar lug 19. The end of the spring-spoke fits loosely in the groove, so that the lug 18 can be sprung from engagement in one notch and moved to another when required without removing the entire spring from the wheel. In order to lock the lug 18 into engagement with a notch in the hub, I use a filler or wedge which consists of a spring 20 or other piece of metal having a lug 21 on one edge. This piece of metal is preferably though not necessarily a spring having equal or less curvature than the spoke when it projects beyond the hub, as shown in Fig. 1. When this spring has a less curvature than the spoke, it exerts a pressure against the hub end of the spoke, tending to stiffen it. In order to hold the spokes in place and their retaining-wedges, a hub-plate 22 is applied to each side of the hub and bears, preferably though not necessarily, directly on the edges of the spokes that project very slightly beyond the face of hub 3 and the slots 14. Each hub-plate 22 is provided with recesses or a continuous circular groove 23, into which the lugs 21 of the wedges take to lock them against radial movement. Bolts 24 are then passed through the holes 16, that register with similar holes in the plates 22, and drawn tight by the nuts on said bolts. The other end of the spring-spoke is held in a securing member or clamp $24^a$, Fig. 6. This is a metal block having a central bolt-hole 25, lateral flanges 26, and transverse grooves 27, that receive the lugs 19 on the outer end of the spring-spoke. Each flange 26 is provided with one or more pins 28, that take into the wooden inner felly 29 of the wheel. The outer felly 30 is spaced from the inner felly by spacing-blocks 31, of wood, aluminium, or other suitable substance, being held in place by the bolts 32, that pass through the metal rim 33, the outer felly 30, the blocks 31, inner felly 29, and spring-clamps $24^a$. Between each spring-clamp and inner felly is placed a chafing-strip $33^a$, of metal, leather, or other suitable substance. A sprocket-wheel 34 is secured to the hub of the driving-wheel. By simply loosening the bolts 24 the hub-plates can be slid sidewise on the hub, the locking members 20 can easily be removed, and any one of the springs adjusted by causing the lug 18 to engage another notch or serration in its groove. Such a structure is very advantageous for the reason that the driving-sprockets are close to the hub of the wheel and the adjustment and truing of the wheel can be accomplished without taking the wheel apart or removing the tire or a spoke can be replaced by another while on the road without inconvenience.

The modification, Fig. 7, shows a structure identical with Fig. 1, excepting that the spring-clamps $24^a$ are secured by an auxiliary bolt 35 between the bolts 32, thus enabling a somewhat greater facility in the removal and adjustment of the spring-spokes.

Having thus described my invention, what I claim as new therein, and desire to secure by Letters Patent, is—

1. In a vehicle-wheel, a hub having slots in its faces, serrations in a wall of each of said slots and spokes whose ends take into the slots, whereby the ends of said spokes can be adjusted to and from the center of the wheel, substantially as described.

2. In a vehicle-wheel, a hub having curved slots in its faces and serrations in a wall of each slot, substantially as described.

3. In a vehicle-wheel, the combination with a hub having slots in its faces and serrations in a wall of each of said slots, of a spring-spoke having a lug thereon adapted to take into a notch of the serrated face, substantially as described.

4. In a vehicle-wheel, the combination with a hub having curved slots in its faces and serrations in one of the faces of each slot, of a curved spoke having a lug to take into one of the notches of the serrated face, substantially as described.

5. In a vehicle-wheel, the combination with a hub having slots cut in its faces and serrations in one wall of each slot, of a metal spoke having a lug to take into a notch of the serrated face and a locking member to hold the lug in engagement with the notch, substantially as described.

6. In a vehicle-wheel, the combination with a hub having slots in its faces and serrations in one wall of each slot, of a metal spoke having a lug thereon adapted to engage the serrated face, a locking member to hold the lug in engagement and plates to hold the locking member and spokes in the slots, substantially as described.

7. In a vehicle-wheel, the combination with a hub having slots in its faces and serrations in a wall of each slot, of spokes having lugs, a locking member having a lug, to lock each spoke in its slot, and plates having recesses to engage the lug on the locking members and hold said members and spokes in their slots, substantially as described.

8. In a vehicle-wheel, the combination with a hub having curved slots in its faces, one wall of each slot having serrations, of curved spring metal spokes, each having a lug on its end, a locking member having a lug, to enter the slots beside each spoke to hold the lug on the spoke in engagement with the serrated face, plates having a circular groove therein into which the lugs on the locking members project, and bolts passing through the plates and hub to lock the parts in assembled position, substantially as described.

9. In a vehicle-wheel, the combination with a hub, of spokes secured to the hub, a locking member also secured in the hub adjacent each spoke and projecting beyond the hub and against each spoke, and means to adjust the hub end of each spoke to and from the center of the hub, substantially as described.

10. In a vehicle-wheel, the combination with a hub, of spring-spokes adjustably secured in the slots, whereby the ends of the spokes can be set farther from or nearer to the center of the hub, a spring locking member in the slots adjacent to each spoke extending beyond the hub and bearing on the spokes to stiffen them, and means to hold both the locking member and spokes in the hub, substantially as described.

11. In a vehicle-wheel, the combination with a hub having slots in its faces and serrations in a wall of each slot; of spokes each having a lug on its end, and each spoke in a slot with its lug engaging a serration and plates taking over the faces of the hub, substantially as described.

12. In a vehicle-wheel, the combination with a spool-shaped hub having serrated slots in its head; of spokes each having a lug on its end, the ends of said spokes adapted to lie in the slots with their lugs engaging a serration, a plate to cover each head of the hub and bolts passing through the heads and plates, substantially as described.

13. In a vehicle-wheel, a felly, a spool-shaped hub having slots in its faces and serrations in a wall of each slot, flat spring-spokes, whose ends are adapted to enter the slots and engage a notch of the serrated face, whereby the length of the spoke can be adjusted, the ends of said spokes secured in opposite faces of the hub, thereby causing a torsion of the spring, plates to hold the ends of the spokes in position and recessing members to unite the spokes and felly.

In testimony that I claim the foregoing as my invention I have signed my name in presence of two subscribing witnesses.

GEORGE D. MUNSING.

Witnesses:
 HENRY C. VAN NOTE,
 CHARLES R. SNYDER.